United States Patent [19]

Haberkorn

[11] Patent Number: 4,903,468
[45] Date of Patent: Feb. 27, 1990

[54] MOWER-CONDITIONER HAVING DEFLECTOR

[75] Inventor: Jean-Paul Haberkorn, Saverne, France

[73] Assignee: Kuhn s.a., Saverne, France

[21] Appl. No.: 212,328

[22] Filed: Jun. 27, 1988

[30] Foreign Application Priority Data

Jun. 26, 1987 [FR] France ................ 87 09183

[51] Int. Cl.⁴ ............... A01D 34/66; A01D 43/10; A01D 57/26; A01D 82/00
[52] U.S. Cl. .................... 56/16.4; 56/13.5; 56/157; 56/DIG. 1
[58] Field of Search .......... 56/DIG. 1, 192, 16.4, 56/14.4, 13.5, 320.1, DIG. 20, DIG. 24, 153

[56] References Cited

U.S. PATENT DOCUMENTS

| 2,679,719 | 6/1954 | Hill | 56/314 |
| 3,157,014 | 11/1964 | Bottenberg | 56/192 X |
| 3,543,491 | 11/1970 | Lausch | 56/192 |
| 3,803,821 | 4/1974 | Peacock et al. | 56/DIG. 1 X |
| 3,881,305 | 5/1975 | Burrough | 56/257 |
| 4,117,653 | 10/1978 | Tarver, Jr. | 56/192 X |
| 4,199,927 | 4/1980 | Craig et al. | 56/314 |

FOREIGN PATENT DOCUMENTS

| 2230245 | 1/1974 | Fed. Rep. of Germany . |
| 2231624 | 1/1974 | Fed. Rep. of Germany . |
| 3233560 | 8/1983 | Fed. Rep. of Germany . |
| 2108290 | 5/1972 | France . |
| 2020156 | 11/1979 | United Kingdom . |
| 2056835 | 3/1981 | United Kingdom . |

Primary Examiner—Stephen J. Novosad
Attorney, Agent, or Firm—Oblon, Spivak, McClelland, Maier & Neustadt

[57] ABSTRACT

A mower-conditioner includes mowing elements for cutting hay and throwing the hay in a backward direction relative to a work direction, conditioning rollers mounted on lateral walls behind the mowing elements, and deflectors positioned at least partially in the path of the thrown hay. The deflectors are mounted adjacent the lateral walls. Each deflector includes an upright planar portion and a front portion. The planar portion is backwardly inclined away from a corresponding lateral wall so as to form a first angle with respect to the axes of the rollers. The planar portion is also angled by an acute second angle with respect to a vertical plane parallel to the first angle such that an upper part of the planar portion is closer to the corresponding lateral wall than is a lower part of the planar portion. The front portio is rounded about an upwardly directed axis and extends outwardly away from the other of the reflectors.

15 Claims, 3 Drawing Sheets

MOWER-CONDITIONER HAVING DEFLECTOR

BACKGROUND OF THE INVENTION

1. Field of the Invention

This invention relates to a mower-conditioner comprising at least one mowing group equipped with cutting elements that rotate around axes directed upward and a conditioning group associated with said mowing group and equipped with conditioning rollers between which the crop cut by the cutting elements passes, said conditioning roller being guided in rotation at each of their ends in a bearing solid with a corresponding lateral wall.

2. Background of the Related Art

These mower-conditioners are used to mow the crop, then mechanically process the cut crop to accelerate its drying. This mechanical processing is performed by the two rollers which extend behind the cutting zone of the cutting elements and between which the crop cut by the cutting elements passes.

The crop cut by the cutting elements is forced to pass between the rollers by the simultaneous action of throwing performed by the rotating cutting elements and of snatching performed by the rollers.

So that all the crop undergoes the desired processing, all of the cut crop must pass between the rollers. Now, it has been found, under certain crop conditions, that a portion of the crop cut by the cutting elements extending in the vicinity of the lateral walls supporting the rollers does not pass between the rollers. This is unacceptable both because this crop does not undergo processing and because it will be difficult to gather at a later time.

In DE-A-2 231 624, a mower-conditioner is known like that described above, which has in the vicinity of each lateral wall a deflector extending at least partially into the flow of crop cut and thrown backward by the pair of cutting elements placed near said lateral wall. Said deflectors are vertical and are directed backward in an inclined manner, considering the direction of work and toward the middle part of the mower-conditioner, i.e., away from the lateral walls. Moreover, the part of said deflectors intended to extend at least partially into the flow of crop cut and thrown backward is approximately planar. In top view, each deflector extends between the corresponding end cutting element of the mowing group and the corresponding lateral wall of the conditioning group. In this way, the conditioning rollers of the conditioning group extend relatively far behind the cutting elements of the mowing group. The crop cut and thrown backward by the cutting elements must thus travel a relatively great distance before arriving in the snatching zone of the conditioning rollers. This is particularly true for crop which is thrown against the deflectors and which must then be deflected toward the rollers. Now, since the crop which strikes the deflectors undergoes a certain braking and since these deflectors extend vertically, it can happen that, under certain conditions, crop thrown against the deflectors falls on the ground without penetrating between the rollers.

The deflectors of this known mower-conditioner have, in addition, a front edge in the form of a sharp edge extending very close to the drum which surrounds the corresponding outside cutting element. This introduces a great drawback. If pieces of cut crop arrive in the space between the front edge of the deflector and the corresponding drum, they will get caught there and create packings. This is due to the fact that the end of each of said pieces of crop which extends to the outside of the deflector is pulled outward by the drum while the end of each of the pieces of crop which extends to the inside of the deflector is pulled inward by the flow of crop. In this way, the pieces are folded by the sharp edge which prevents them from being released.

SUMMARY OF THE INVENTION

The object of this invention is to improve the operation of the known mower-conditioner so that all of the cut crop passes between the conditioning rollers.

For this purpose, in the mower-conditioner according to the invention the part of the deflector that extends at least partially into the flow of crop cut and thrown backward, forms - with respect to a vertical plane that makes, in top view, approximately the same angle with the longitudinal axes of the rollers as said part of the deflector - an acute angle so that the upper edge of the deflector is farther from the middle part of the mower-conditioner than its lower edge, and in which the front edge of the deflector is rounded outwardly.

Because the part of the deflector intended to extend into the flow of crop cut and thrown backward forms said acute angle, it is possible to assure that all the cut crop which is thrown against it is deflected toward the rollers. Actually, this results from the special orientation of this part that extends into the crop flow, which imparts to the crop that it deflects, in addition to the backward component, a certain upward component.

Since the front edge of the deflector is rounded outward, the pieces of crop which arrive at said front edge can be carried along by the rest of the crop thrown backward by sliding over this front edge without being caught there. Because the rounding is directed outward, a good continuity between the front edge and the plane part which deflects the crop is possible.

According to a preferred embodiment, the part of the deflector that extends into the flow of crop cut and thrown backward is positioned in the vicinity of the inner face of the corresponding lateral wall.

Advantageously, the deflector forms —with respect to the direction of the longitudinal axis of the rollers —an angle between 55° and 85°. Also advantageously, the acute angle between the part intended to extend into the flow of cut crop and the vertical plane defined above has a value between 5° and 20°.

In a preferred embodiment, the front edge of the deflector has approximately the shape of a portion of a cylindrical surface.

To prevent the cut crop from being admitted between the deflector and the front edge of the corresponding lateral wall, it is advantageous that the front edge of the deflector at least partially surround the front edge of the corresponding lateral wall.

When the cutting element that extends closest to the corresponding lateral wall is of a type known in the art to be surmounted by a rotating drum, it is advantageous that the front edge of the deflector extend relatively near and at least approximately parallel to the outer surface of the drum.

Advantageously, the deflector is connected to the corresponding lateral wall.

Preferably, the deflector is connected in a removable way to the corresponding lateral wall. In this way, it can easily be replaced when it is worn or damaged, or removed when under certain very specific crop conditions, its presence could prove disadvantageous.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a partial section along plane IV-IV defined in FIG. 1.

DETAILED DESCRIPTION OF THE PREFERRED EMBODIMENTS

Figure 1:
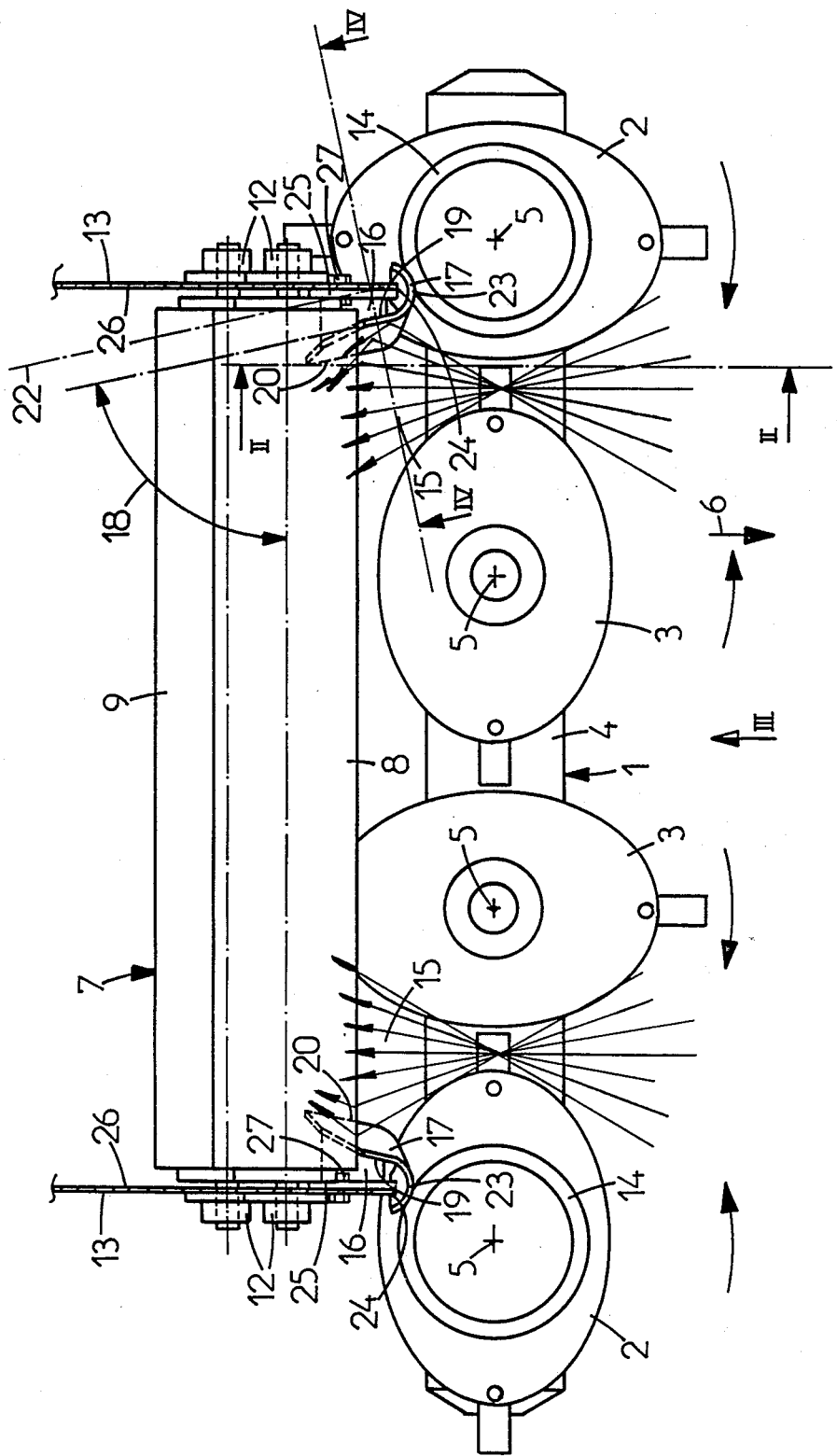
FIG. 1 is a partial top view in section along plane I—I defined in FIG. 2, of a mower-conditioner according to the invention.

The mower-conditioner of the invention comprises a mowing group (1) equipped in a nonlimiting way with four cutting elements (2, 3). In the example shown, cutting elements (2, 3) are mounted on the upper face of a housing (4) for rotation around upwardly extending axes (5). These cutting elements (2, 3) extend crosswise to work direction (6), as seen in FIG. 1.

Behind mowing group (1) extends a conditioning group (7). This conditioning group (7) comprises two rollers (8, 9) that rotate in opposite directions along arrows (10, 11) as seen in FIG. 2, so that the crop cut by cutting elements (2, 3) passes between said rollers (8, 9). These rollers (8, 9) are rotatably guided in rotation in bearings (12) provided on lateral walls (13). These lateral walls (13) extend approximately vertically and approximately parallel to work direction (6), i.e., in the example shown, approximately perpendicular to the longitudinal axis of rollers (8, 9). It can also be seen in FIG. 1 that each lateral wall (13) extends behind a drum (14) that surmounts a corresponding cutting element (2) at each end of mowing crop (1).

Figure 2:
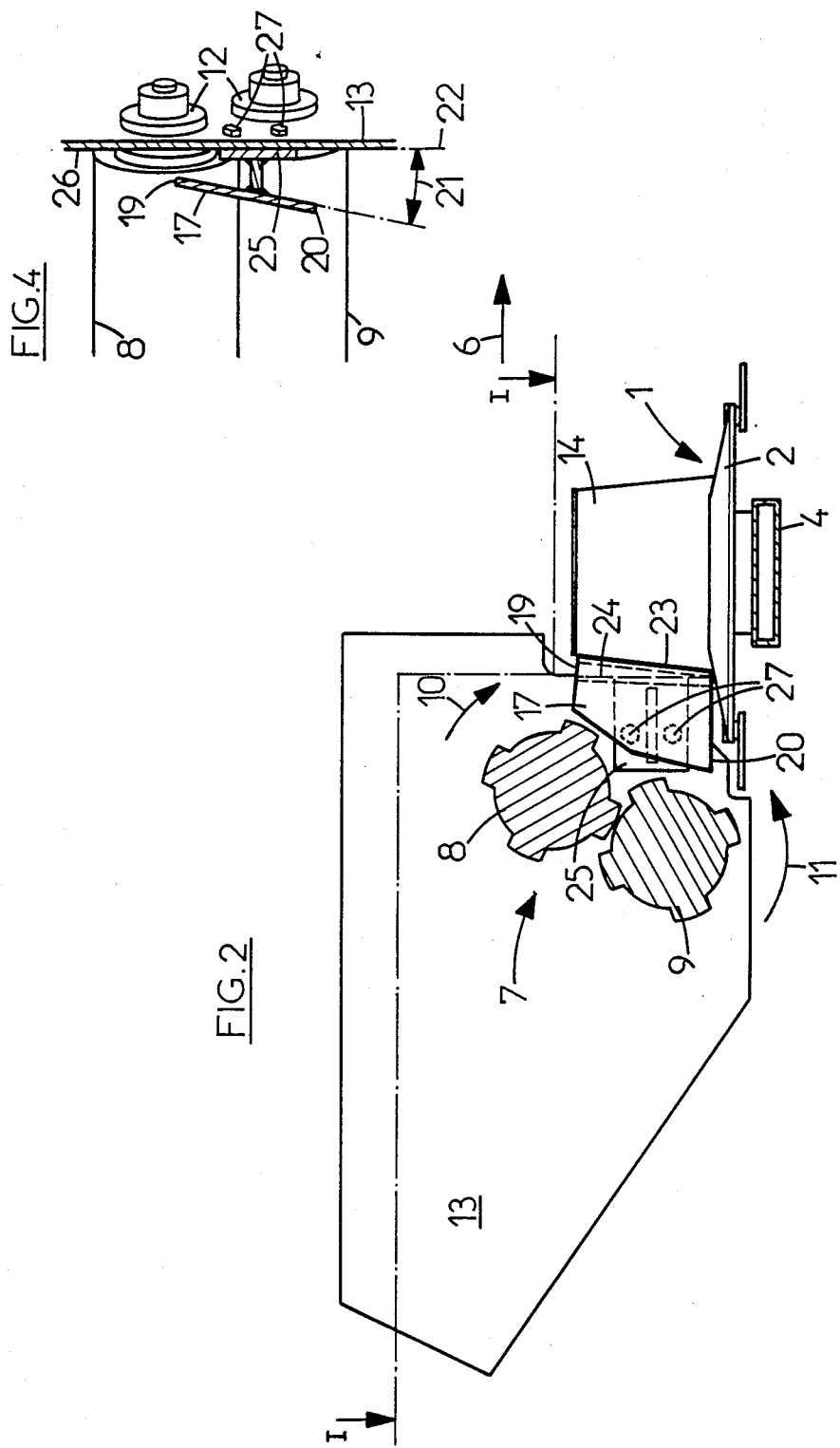
FIG. 2 is a section along plane II-II defined in FIG. 1, of the mower-conditioner of FIG. 1.
Figure 3:
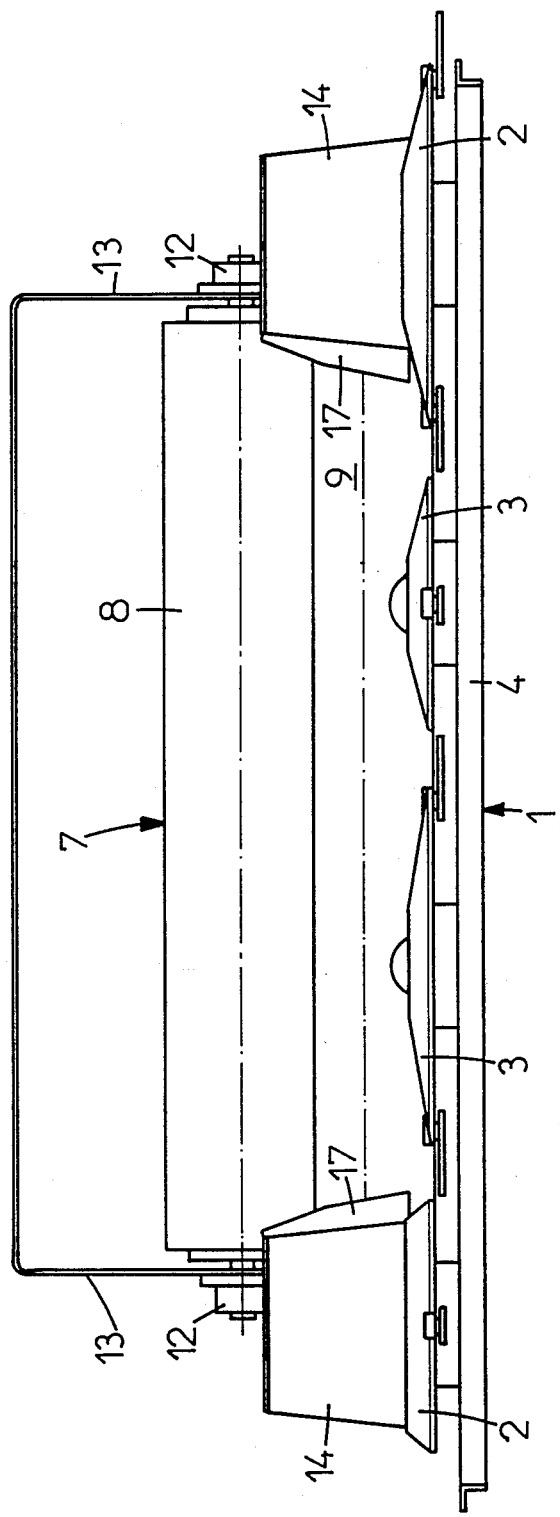
FIG. 3 is a front view along arrow III defined in FIG. 1, of the mower-conditioner of FIGS. 1 and 2.

During work, cutting elements (2, 3) of each pair of cutting elements, (2, 3) rotate in the directions of rotation indicated in FIG. 1. The crop cut by each pair of cutting elements (2, 3) is thus substantially concentrated in the middle part between the two cutting elements (2, 3) of said pair, then thrown backward in a flow (15).

To prevent the crop cut and thrown backward by cutting element (3) of each pair of cutting elements (2, 3) from arriving in zone (16) from where it could be thrown to the outside of corresponding lateral wall (13) or else where it could get caught and eventually interfere with the work, there has been provided, according to the invention, a deflector (17). As can be seen in the figures, this deflector (17) extends in the vicinity of inner face (26) of a lateral wall (13) and at least partially into the flow (15) of the crop cut and thrown backward by the pair of corresponding cutting elements (2, 3). This deflector (17) is upright and directed in an inclined manner backward and toward the middle part of the mower-conditioner so as to form —with the longitudinal axes of rollers (8, 9) —a first angle (18). In the example shown, the value of angle (18) is about 78°. In addition, it can be seen in FIGS. 1 and 4 that upper edge (19) of deflector (17) is farther from the middle part of mowing group (1), i.e., closer to its corresponding lateral wall, than its lower edge (20). Moreover, the part of deflector (17) which is intended to stop the thrown crop so that it does not arrive in zone (16) is approximately planar and forms a second angle (21) with a vertical plane (22) that makes approximately the same angle with the longitudinal axis of rollers (8, 9) as does deflector (17), i.e., the vertical plane in top view parallel to the first angle. In the example shown, this angle (21) has a value of about 11°. Front edge (23) of deflector (17) is rounded outwardly away from the other deflector and has the shape of a portion of a substantially vertical cylindrical surface. As can be seen, this front edge (23) at least partially surrounds front edge (24) of corresponding lateral wall (13). In addition, it can be seen that front edge (23) extends relatively close and approximately parallel to the outside surface of corresponding drum (14).

Finally, it can further be seen that deflector (17) is connected in a removable way to corresponding lateral wall 913). To do this, deflector (17) is provided with a lug (25) which is applied against inner face (26) of corresponding lateral wall (13) and is fastened thereto by bolts (27).

It will be noted that all of the elements which are not directly related to the object of the invention, such as the frame of the mower-conditioner, the elements for driving cutting elements (2, 3) and conditioning rollers (8, 9), etc. ... have not been shown and described because they are within the skill of a man of the art.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mower-conditioner, comprising:
   at least one mowing group comprising mowing means for cutting crop and throwing the cut crop backward when considering a work direction;
   conditioning means associated with said at least one mowing group and comprising a middle part, said conditioning means extending behind said associated mowing means, when considering said work direction, for conditioning the thrown crop, said conditioning means comprising two lateral walls and two conditioning rollers rotatably supported in said two lateral walls and crossing the path of the thrown crop, whereby the crop passes between said rollers; and
   deflector means associated with said at least one mowing group and said corresponding conditioning means, said deflector means being positioned at least partially in the path of the thrown crop and comprises two deflectors, each one of which extending in the vicinity of a corresponding one of said two lateral walls and comprising:
   (a) an upright portion in the path of the thrown crop, said upright portion, in top view, being inclined such that a rear part of said upright portion is closer to said middle part of said conditioning means than is a forward part of said upright portion, said upright portion thus forming a first angle with respect to said rollers, said upright portion also being angled by an acute second angle with respect to a vertical plane in top view at least approximately parallel to said first angle such that a lower part of said upright portion is closer to said middle part of said conditioning means than is an upper part of said upright portion; and (b) a front portion extending from said forward part of said upright portion outwardly away from the other of said deflectors.

2. The mower-conditioner of claim 1 wherein each one of said deflectors is positioned adjacent an inner face of the corresponding one of said lateral walls.

3. The mower-conditioner of claim 1 wherein said first angle is between 55° and 85°.

4. The mower-conditioner of claim 3 wherein said first angle is about 78°.

5. The mower-conditioner of claim 1 wherein said second angle is between 5° and 20°.

6. The mower-conditioner of claim 5 wherein said second angle is approximately 11°.

7. The mower-conditioner of claim 1 wherein said mowing means comprises a plurality of cutting elements extending transverse to said work direction and each one of which rotating about a corresponding upwardly directed axis, a cutting element closest to at least one of said lateral walls being surmounted by a rotating drum.

8. The mower-conditioner of claim 7 wherein said lateral wall is arranged behind said drum, when considering the work direction.

9. The mower-conditioner of claim 7 wherein said front portion of the corresponding one of said deflectors is positioned close to, and substantially parallel to said drum.

10. The mower-conditioner of claim 1 wherein said front portion of each one of said deflectors at least partially surrounds a front edge of the corresponding one of said lateral walls.

11. The mower-conditioner of claim 1 wherein each one of said deflectors is mounted on the corresponding one of said lateral walls.

12. The mower-conditioner of claim 11 wherein each one of said deflectors is removably mounted on the corresponding one of said lateral walls.

13. The mower-conditioner of claim 1 wherein said upright portion is at least approximately plan.

14. The mower-conditioner of claim 1 wherein said front portion of each one of said deflectors is rounded outwardly away from the other one of said deflectors.

15. The mower-conditioner of claim 14 wherein said front portion of each one of said deflectors has approximately the shape of a portion of a substantially vertical cylindrical surface.

* * * * *